(No Model.) 4 Sheets—Sheet 1.

G. F. SIMONDS.
BALL BEARING.

No. 434,476. Patented Aug. 19, 1890.

Witnesses:
J. A. Rutherford.
Geo. W. Rea.

Inventor:
George F. Simonds,
By James L. Norris
Attorney.

(No Model.) 4 Sheets—Sheet 2.

G. F. SIMONDS.
BALL BEARING.

No. 434,476. Patented Aug. 19, 1890.

Witnesses:
J. A. Rutherford.
Geo. W. Rea.

Inventor:
George F. Simonds.
By James L. Norris
Attorney (No Model.) 4 Sheets—Sheet 3.

G. F. SIMONDS.
BALL BEARING.

No. 434,476. Patented Aug. 19, 1890.

(No Model.) 4 Sheets—Sheet 4.

G. F. SIMONDS.
BALL BEARING.

No. 434,476. Patented Aug. 19, 1890.

Witnesses:
J. A. Rutherford.
Geo. W. Rea.

Inventor:
George F. Simonds.
By James L. Norris
Attorney.

UNITED STATES PATENT OFFICE.

GEORGE FREDERICK SIMONDS, OF FITCHBURG, MASSACHUSETTS.

BALL-BEARING.

SPECIFICATION forming part of Letters Patent No. 434,476, dated August 19, 1890.

Application filed January 9, 1890. Serial No. 336,402. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Ball-Bearings, of which the following is a specification, reference being had to the accompanying drawings.

My invention relates to bearings in which spherical rollers or balls are employed for diminishing the friction, and in which the bearing-surfaces are formed on separate rings or annular pieces, so that they can be conveniently and effectually hardened or tempered and finished before the parts of the bearing are put together.

My present invention comprises a bearing, in which some of the balls are arranged between plane bearing-surfaces upon inner and outer rings or annular pieces for the purpose of transmitting or resisting thrust or end pressure, and the remainder of the balls are arranged between concentric surfaces upon the same or upon other inner and outer rings or annular pieces for the purpose of supporting a shaft or the like, or for resisting lateral motion of a shaft or the like in its bearing, or of a turn-table, turret, or other rotating structure upon its pivot.

In my improved bearing the inner rings are provided with external and the outer rings with internal circumferential projections, ribs, or flanges, and the balls are arranged in circular series or groups between the said rings, one or more of the said groups of balls being arranged to bear against and roll upon plane surfaces on the corresponding rings, and the other group or groups of balls being arranged to bear against concentric surfaces on the corresponding rings.

Figure 1:
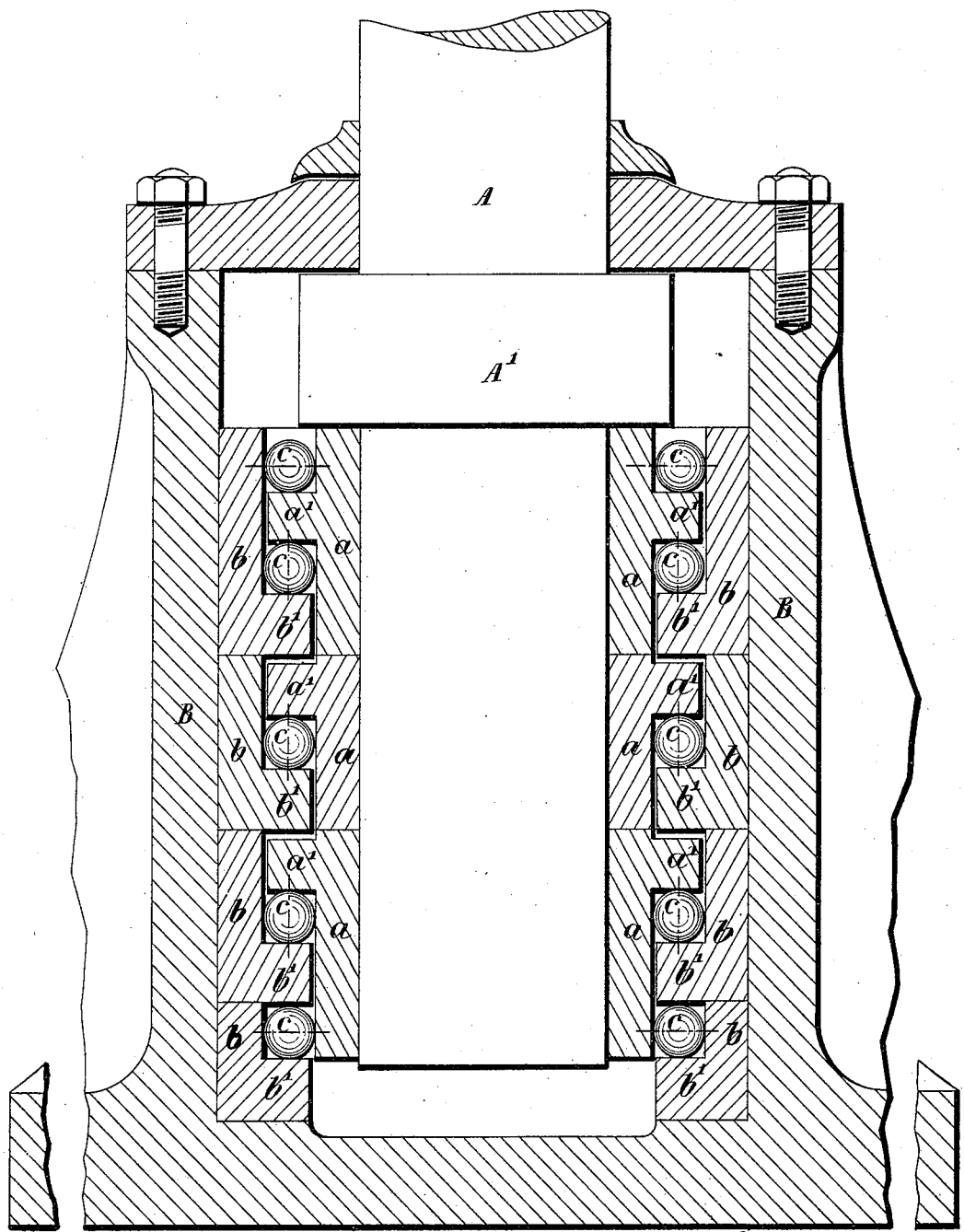
Figure 2:
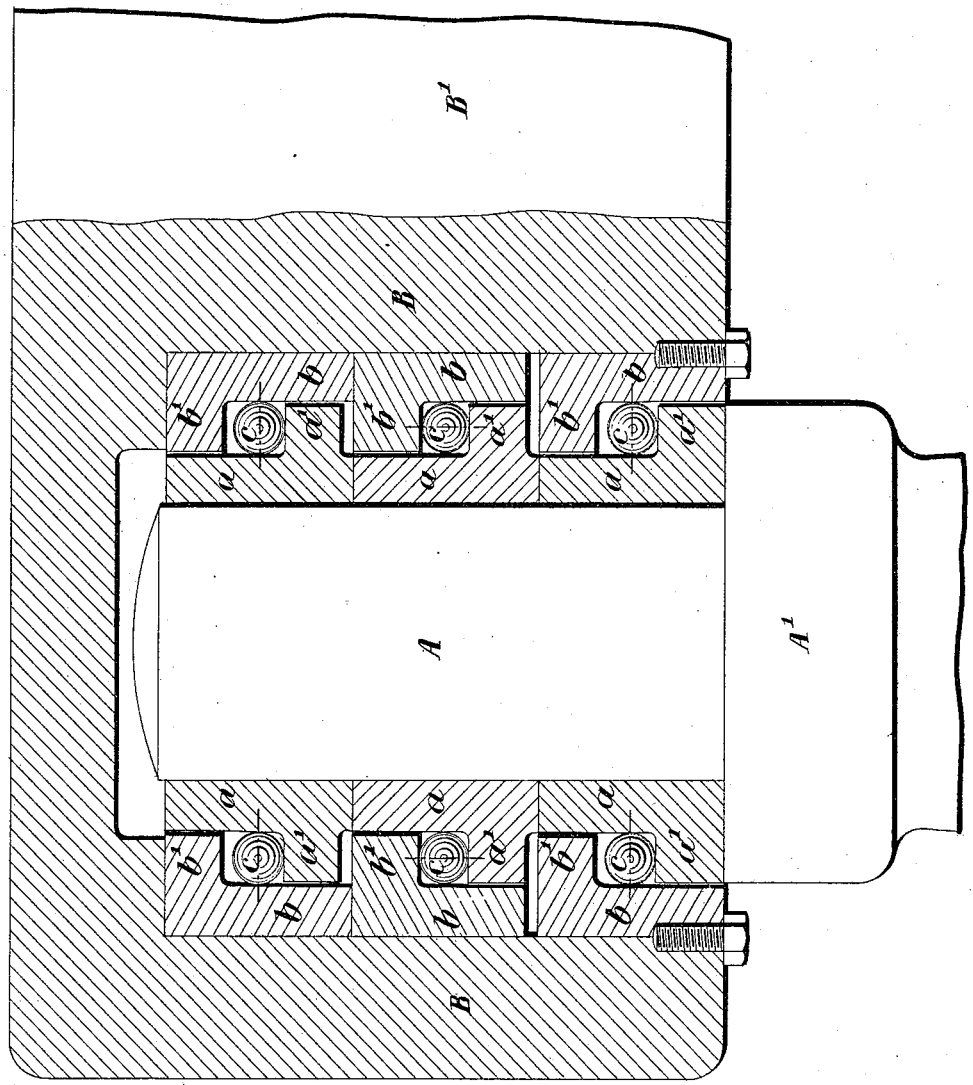
Figure 3:
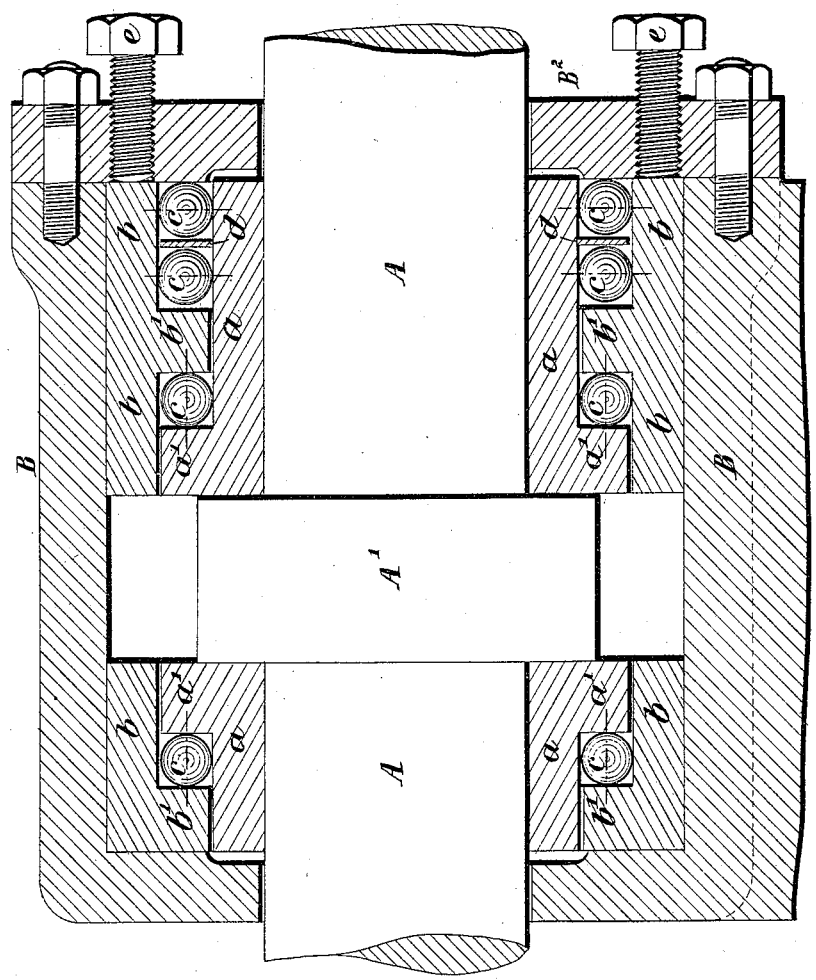
Figure 4:
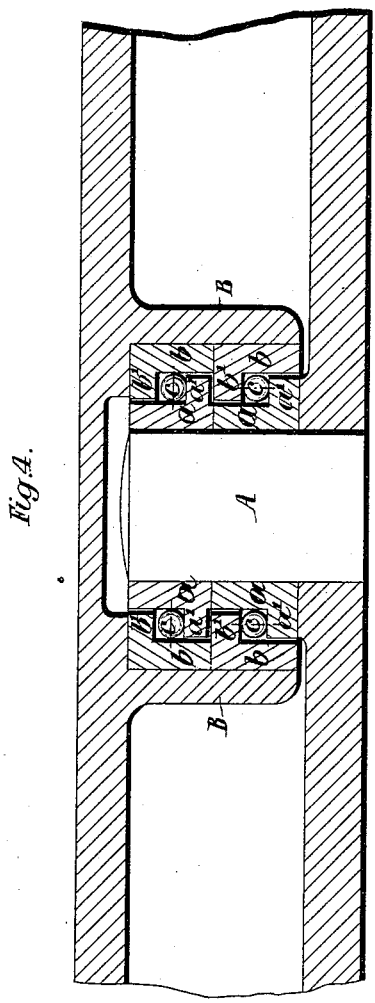

In the accompanying drawings, Figure 1 is a vertical central section of a step-bearing constructed to my present invention. Fig. 2 is a vertical central section of a bearing constructed according to my said invention for the overhanging arm of a drilling or other machine, or for a rotating part of machinery where suitable. Fig. 3 is a vertical longitudinal central section of a thrust or end pressure bearing constructed according to my said invention; and Fig. 4 is a vertical central section of a bearing constructed according to my said invention for a turn-table or turret arranged to rotate about a central pivot.

A is a shaft or pivot-pin, on which are fitted the inner rings $a$.

B is a box or casing, in which are fitted the outer rings $b$.

The rings $a$ are provided with external circumferential projections, ribs, or flanges $a'$, and the rings $b$ are provided with internal circumferential projections, ribs, or flanges $b'$.

$c\ c$ are the spherical rollers or balls, which are arranged in circular series or groups between the rings $a\ b$.

In the bearing shown in Fig. 1 the shaft A is provided with a fixed collar A', beneath which are arranged, one below another, the rings $a$. The rings $b$ are arranged, one above another, in the box or casing B.

Between the ribs or flanges $a'\ b'$ of the rings $a\ b$ at the top of the bearing there is a circular series or group of balls $c$, which balls bear against and roll upon plane surfaces on the said ribs or flanges. There is also a circular series or group of balls resting upon the rib or flange $a'$ of the said ring $a$. The balls of this series or group bear against and roll upon concentric surfaces on the said rings $a\ b$. The balls between the rings $a\ b$ of the middle pair are arranged to bear against and roll upon plane surfaces on the ribs or flanges $a'\ b'$ of the said rings. At the lower end of the bearing there are two outer rings $b$, arranged one above another in combination with a single inner ring $a$. One series or group of balls $c$ is arranged between the flange $a'$ of the said ring $a$ and the flange $b'$ of the corresponding ring $b$, so that the said balls bear against and roll upon plane surfaces on the said flanges. Another series of group of balls $c$ is arranged between the said ring $a$ and the lowermost ring $b$, so that the said balls bear against and roll upon concentric surfaces on the said rings.

To more clearly indicate which of the balls support the shaft A and which of them prevent lateral motion of the said shaft, dotted lines are drawn through the points of contact of the balls with the bearing-surfaces of the rings.

In the bearing shown in Fig. 2, the box or casing B forms part of the overhanging arm B' of a drilling or other machine. There are three pairs of rings *a b*, arranged one above another, the rings *a* being fitted upon the post or pivot-pin A and resting upon the collar A' thereon, and the rings *b* being fitted in the box or casing B. The middle pair of rings *a b* is arranged in combination with balls *c*, which bear against and roll upon plane surfaces on the flanges *a' b'* of the said rings and support the arm B'. The upper and lower pairs of rings *a b* are arranged in combination with balls *c*, which bear against and roll upon concentric surfaces on the said rings, and serve to maintain the said arm in its horizontal position.

In the bearing shown in Fig. 3 there is a pair of rings or annular pieces *a b* on each side of the collar A' on the shaft A. Between the rings on the left-hand side of the said collar the balls *c* are arranged in a circular series or group and bear against and roll upon plane surfaces on the flanges *a' b'* of the said rings. Between the rings *a b* on the other side of the said collar there are three circular series or groups of balls *c*. One of these series or groups is arranged between the flanges *a' b'* of the said rings, so that the balls bear against and roll upon plane surfaces on the said flanges. The other series or groups of balls are so arranged between the said rings *a b* that the said balls bear against and roll upon concentric surfaces on the said rings. Moreover, suitable rings *d* are arranged between these series or groups of balls to separate the balls of one series from those of the other series. The box or casing B is provided with a cover B² and with screws *e* for adjusting the outer rings *b* relatively to the inner rings *a* to bring the balls *c* between the plane surfaces to a bearing thereon, or to compensate for wear, if necessary.

Fig. 4 shows a bearing in which one pair of the rings *a b* has the balls arranged to bear against and roll upon plane surfaces on the ribs or flanges *a' b'* of the said rings, and the other pair of the said rings has the balls arranged to bear against and roll upon concentric surfaces thereon.

It is obvious that the construction of my improved bearing may be somewhat further modified without departing from the nature of my said invention.

It will be understood that I do not herein claim the adjusting-screws *e*, recessed rings *a*, nor the arrangement of bearings on each side of the collar A', as such are claimed in an application filed by me November 26, 1889, Serial No. 331,639.

What I claim is—

1. In a ball-bearing, the combination of inner and outer rings or annular pieces, the inner rings having external and the outer rings internal circumferential projections, ribs, or flanges, and balls arranged in circular series or groups between the said rings or annular pieces, the balls of one series or group being arranged to bear against and roll upon plane surfaces on the ribs or flanges of the corresponding rings, and the balls of another series or group being so arranged that they bear against and roll upon concentric surfaces on the corresponding rings, substantially as hereinbefore described.

2. In a ball-bearing, the combination of inner and outer rings or annular pieces, the inner rings having external and the outer rings internal circumferential projections, ribs, or flanges, a circular series or group of balls so arranged between two of the said rings that the said balls bear against and roll upon plane surfaces on the ribs or flanges thereof, and circular series or groups of balls so arranged between others of the said rings that the balls of one series or group bear against and roll upon plane surfaces on the ribs or flanges of these rings, and the balls of another series or group bear against and roll upon concentric surfaces on the said rings, substantially as hereinbefore described.

3. The combination, with a shaft or pivot-pin A, of rings or annular pieces *a*, mounted upon the said shaft or pivot-pin and having external circumferential projections, ribs, or flanges *a'*, rings or annular pieces *b*, surrounding the rings *a* and having internal circumferential projections, ribs, or flanges *b'*, and balls *c*, arranged between the said rings, some of the said balls bearing against plane surfaces on the ribs or flanges of the corresponding rings and the other balls bearing against concentric surfaces on the corresponding rings, substantially as and for the purposes set forth.

In testimony whereof I have hereunto signed my name in the presence of two subscribing witnesses.

GEORGE FREDERICK SIMONDS.

Witnesses:
DAVID YOUNG,
CHAS. B. BURDON.